United States Patent [19]

Sugata

[11] 4,386,674

[45] Jun. 7, 1983

[54] APPARATUS FOR PREVENTING OVERTURN

[75] Inventor: Takashi Sugata, Ryugasaki, Japan

[73] Assignee: Toyo Umpanki Co., Ltd., Osaka, Japan

[21] Appl. No.: 218,131

[22] Filed: Dec. 19, 1980

[30] Foreign Application Priority Data

Dec. 27, 1979 [JP] Japan .............................. 54-169450

[51] Int. Cl.³ .............................................. B62D 5/06
[52] U.S. Cl. .................................... 180/142; 180/282; 280/755; 340/52 H
[58] Field of Search ............... 180/142, 179, 143, 141, 180/282, 271, 284; 280/755, 90; 340/52 F, 53, 52 H

[56] References Cited

U.S. PATENT DOCUMENTS 2,957,535 10/1960 Helgeson ............................. 180/143
3,067,832 12/1962 Wohl .................................. 180/143
3,882,953 5/1975 Maisch ................................ 180/141
3,908,779 9/1975 Inoue .................................. 180/142
3,939,938 2/1976 Inoue .................................. 180/142

Primary Examiner—David M. Mitchell
Attorney, Agent, or Firm—Sughrue, Mion, Zinn, Macpeak, and Seas

[57] ABSTRACT

Apparatus for preventing a vehicle from overturning on a curve due to a too high speed. First and second signals are produced, respectively, in proportion to the square root of the vehicle speed and in proportion to the sine of the steering angle. The first and second voltages are summed and amplified to produce a third signal. The third is compared with a reference voltage and fourth signal is produced if the third signal exceeds the reference voltage. An operational parameter of the vehicle such as the required force to operate the power steering unit or the fuel flow rate to the carburetor is varied to prevent overturn.

7 Claims, 6 Drawing Figures

APPARATUS FOR PREVENTING OVERTURN

BACKGROUND OF THE INVENTION

The present invention relates to an apparatus for preventing particular vehicles having high centers of gravity, such as container carrying vehicles, from overturning when travelling around a curve in a road.

Large vehicles such as container carriers are provided with power steering mechanisms to provide for steering ease over a large range of turning angles or radii of curvature. Such vehicles typically travel at a relatively high speeds of several tens km/h on straight routes such as at a wide working site. Because such vehicles often travel at a relatively high speed and because the steering load thereof is light, there is a relatively great possibility that the operator may inadvertently oversteer on a curve causing the vehicle to overturn due to its high center of gravity.

SUMMARY OF THE INVENTION

The present invention utilizes the general principles that the centrifugal force which induces overturn is proportional to the second power of the vehicle speed and increases in inverse proportion to the radius of curvature of the path of the vehicle or turning radius. According to the present invention, the turning radius is restricted when the vehicle is travelling at a high speed in such a manner that the higher the vehicle speed, the stronger is the force required to rotate the steering wheel while the rotational range of the steering wheel is simultaneously narrowed.

More specifically, a first signal is produced which is related to the vehicle speed, preferably with the first signal being in proportion to the square root of the vehicle speed. A second signal is produced which is related to the steering angle and is preferably in proportion to the sine of the steering angle. The first and second signals are added to produce a third signal. The third is compared with a fixed predetermined reference value and, when the third exceeds the reference value, a fourth signal is produced which, in a preferred embodiment, has an amplitude in proportion to the amount by which the third signal exceeds the reference value. An operational parameter of the vehicle is varied in response to the fourth signal in such a manner as to prevent the overturn of the vehicle. This may be done by controlling the flow rate of hydraulic fluid to the power steering unit of the vehicle so that the effort required to steer the vehicle increases. Alternatively, the means for controlling the operational parameter of the vehicle can be implemented by a control valve disposed in a fuel line of the vehicle so that the fuel flow is slowed and the vehicle accordingly slowed when the fourth signal is present. Yet further, the accelerator pedal of the vehicle can be deactivated in response to the presence of the fourth signal. If desired, an alarm can be provided which is actuated in response to at least one of the third and fourth signals to produce an audible or visible indication to the driver that corrective action should be taken to prevent overturn.

DESCRIPTION OF THE PREFERRED EMBODIMENTS

Figure 1:
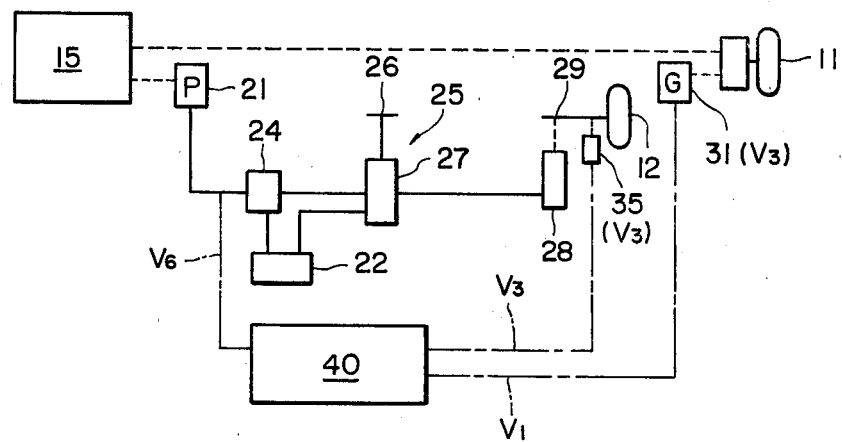
FIG. 1 is a diagram showing an electric and hydraulic system according to the present invention.

A preferred embodiment of the invention is shown in FIG. 1 which is a diagram of an electric and hydraulic brake system of a large vehicle. Here, a speed voltage $V_1$, which is an output terminal voltage of a speed electric generator 31 operatively coupled to a driven wheel 11 of the vehicle or the drive train of the vehicle, and a direction voltage $V_3$, which is an output of a potentiometer 35 which is determined by the steering angle or turning radius of the vehicle, are applied to inputs of a control circuit 40 where they are electrically algebraically summed. When the sum voltage $V_5$ exceeds a predetermined level, an output is generated by the control circuit. In accordance with the output signal, the flow of pressurized fluid from a steering pump 21 to a power steering unit 25 is restricted.

Figure 2:
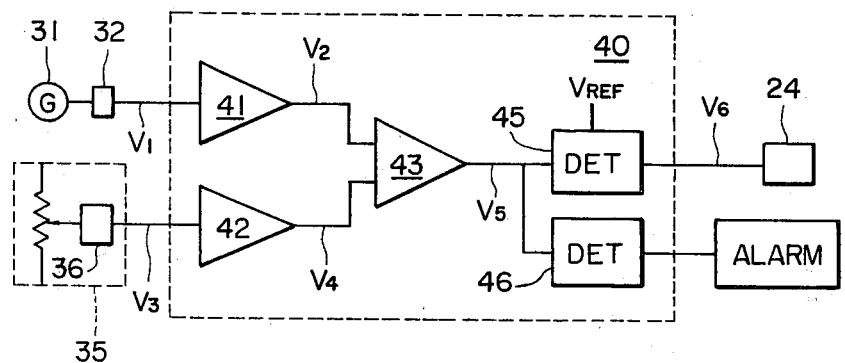
FIG. 2 is a block diagram showing an electric circuit used in the system of FIG. 1.

The control circuitry 40 includes electric circuits as shown in FIG. 2 in greater detail. A DC input $V_1$ from the speed generator G is amplified by a first amplifier 41. In this circuit, preferably, the output $V_2$ of the first amplifier 41 is in proportion to the square root of the input voltage.

Figure 3:
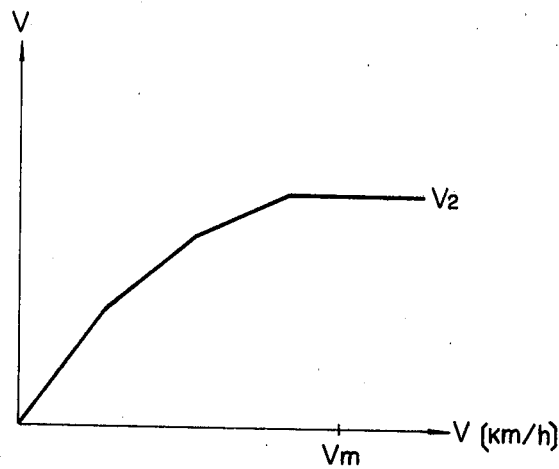
FIG. 3 is a graph showing an output of the second amplifier.

It is in general difficult to obtain an output in proportion to a square root of an input using only a single amplifier. For this reason, a plurality of amplifying elements having different operational points are coupled in parallel and the sum of respective outputs thereof is used as an output of the composite amplifier to thereby obtain an output $V_2$ which approximately follows a quadratic curve. In this circuit, when the input signal exceeds a predetermined voltage, the amplification factors of the amplifying elements gradually become saturated with the amplification factors thereof gradually decreasing as shown in FIG. 3. FIG. 3 shows the case where three amplifying elements are coupled in parallel. The number of the parallel elements used may be determined in accordance with the accuracy needed.

The input $V_3$ from the potentiometer 35 is passed through a half-wave rectifier 36. The output voltage from the half-wave rectifier 36 is either always positive or always negative, depending on the chosen connection, and is in proportion to the angular variation of the steered wheel 12 from the straight-ahead position whether the steered wheel 12 is turned to the right or the left. (As used herein, "steered " wheel means a wheel of the vehicle in contact with the ground which is turned in response to movement of the "steering" wheel which is directly moved by the operator of the vehicle. The steering wheel may be implemented with a handle or wheel as desired.) It is, however, possible to use a mechanical linkage or the like to mechanically convert the right and left angular changes of the steering wheel 12 into movement in only a single direction and thereafter to convert that movement into an electric output.

The output $V_3$ of the potentiometer 35 is amplified by a second amplifier 42. It is preferable that the output $V_4$ of the second amplifier follow a sine curve with respect to the angular position $\theta$ of the steered wheel 12, that is, $V_4 \propto \sin \theta$. For this purpose, a potentiometer which produces an output signal having a magnitude in proportion to the sine of the input shaft of the potentiometer is used. Alternately, if the output $V_3$ of the potentiometer 35 is in proportion to the angle $\theta$, by properly constructing the second amplifier 42, when the input voltage increases, the amplification factor of the second amplifier 42 can be made to decrease due to amplifier saturation so that the output $V_4$ of the second amplifier 42 is again approximately $\sin \theta$. The output $V_2$ of the first amplifier 41 and output $V_4$ of the second amplifier 42 are applied to inputs of a third amplifier 43. The third amplifier sums the outputs $V_2$ and $V_4$ and further amplifies the sum signal.

The output $V_5$ of the third amplifier is applied to a detecting circuit 45. The detecting circuit 45 generates an output $V_6$ when the output of the third amplifier 43 exceeds a preset constant level $V_{REF}$. The detecting circuit 45 may be composed of, for example, a differential amplifier connected to produce an output in proportion to the amount that the input signals exceed the constant level. The output $V_6$ of the detecting circuit 45, which serves as the output of the control circuitry 40, is coupled to actuate a magnetic proportional flow control valve 24.

The valve 24 is operatively coupled in a hydraulic line between an orbit roll 27 of the power steering mechanism and a steering pump 21. The valve decreases the flow rate of hydraulic fluid from the steering pump 21 in response to the output of the control circuitry 40. Accordingly, when the flow rate of the pressurized oil introduced into the orbit roll 27 is decreased in response to the output of the control circuitry 40, the amplifying rate of the manual steering power of the power steering mechanism is decreased to apply an increased load to the steering wheel 26. At this time, it is therefore difficult to further rotate the steering wheel 26.

As mentioned above, according to the present invention, the voltage $V_1$, which is the output of the speed electric generator 31 and is in proportion to the travelling speed of the vehicle, is amplified and the output voltage of the potentiometer 35, which is in proportion to the steering angle, is amplified and the two signals summed and further amplified to produce the voltage $V_5$. When the voltage $V_5$ exceeds the preset constant level, the output $V_6$ is generated from the control circuitry 40. By operation of the flow control valve 24 in response to the final output $V_6$, the flow rate of the pressurized fluid introduced into the power steering mechanism 25 is decreased. Therefore, when the steering wheel 26 is manually turned during travelling at a relatively high speed of the vehicle, the steering wheel 26 becomes difficult to rotate beyond a predetermined angle which is set in response to the vehicle speed. Thus, according to the invention, sudden or rapid steering operations can be prevented.

Figure 4:
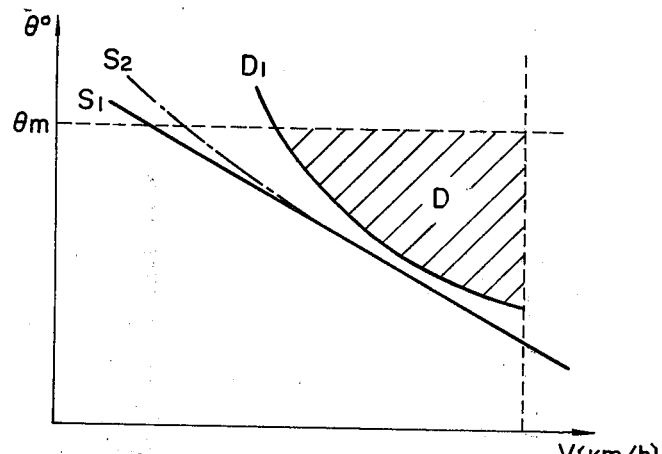
FIGS. 4 and 5 show operational regions of the overturning prevention apparatus of the invention.

The output $V_5$ of the third amplifier 43 can be set within a safe region below a constant level S as shown in FIG. 4 in which D designates a potential vehicle overturning region due to centrifugal force. The safe region is determined in accordance with $F = Mv^2 (\sin \theta)/L$ where M is the mass of the vehicle, v is the speed, $\theta$ is the steering angle and L is the base length within a maximum steering angle $\theta_m$ and the maximum speed $v_m$.

More specifically, although the overturning limit curve $D_1$ is determined by the product of the second power value of the speed and the sine of the steering angle, for example, if the output $V_2$ of the first amplifier 41 is simply in proportion to the speed and the output $V_4$ of the second amplifier 42 is simply in proportion to the steering angle $\theta$, the voltage $V_5$ representing the sum of the two is linearly related to the speed and the steering angle as denoted by the line $S_1$ in FIG. 4. However, by the selection of a suitable reference voltage, the output $V_6$ of the control circuitry is produced before the steering angle can exceed the limit at which the vehicle will overturn.

In case the output $V_4$ of the second amplifier 42 approximates $\sin \theta$ with respect to the steering angle $\theta$, the point at which the output $V_5$ of the third amplifier reaches the reference voltage follows the curve $S_2$ shown in FIG. 4 which more closely parallels the limit curve $D_1$. In that case, more accurate operation of the control circuit is obtained.

Figure 5:
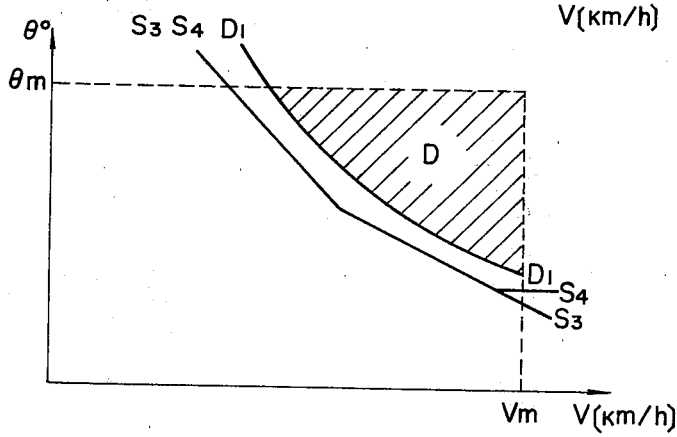

Furthermore, in the case of two amplifying elements having different operational points arranged in parallel with the first amplifier, when the speed is sufficiently increased, the voltage $V_1$ applied to the input of the first amplifying circuit 41 will exceed the preset constant value. As a result, the amplification factor is decreased so that the voltage $V_2$ applied to the third amplifier varies as shown in FIG. 3. Accordingly, if the direction voltage $V_3$ is in proportion to the steering angle $\theta$, the speed and the steering angle $\theta$ signals coupled to the detecting circuit 45 vary as denoted by the curve $S_3$ in FIG. 5. This curve $S_3$ even more closely parallels the limit curve $D_1$.

In addition, if a Zener diode is provided to prevent the output of the first amplifier from exceeding the preset constant value, the effect due to speed change is eliminated above a constant vehicle speed.

The detecting circuit is not limited to that described above. It is possible to arrange in parallel another detecting circuit 46 which actuates an alarm for the driver when the output $V_5$ of the third amplifier 43 reaches a level somewhat below that at which the flow adjustment valve 24 is operated.

Also, it is possible not only to adjust the flow rate of hydraulic fluid into the power steering mechanism in accordance with the output $V_6$ of the control circuitry 40 but also to restrict the carburetor of the vehicle's engine and to restrict or close a fuel valve thereby decreasing the speed of the vechicle. It is further possible to close the fuel flow of the carburetor in accordance with the output $V_6$ of the control circuit 40 using a technique in which the magnetic actuator deactivates the accelerator pedal in response to the output $V_6$ of the control circuit 40.

It is to be noted that the preset constant value, that is, the standard or reference voltage $V_{REF}$ used for the detector 46 is determined by the characteristics of the particular vehicle such as by the location of its center or gravity, width and the like.

Figure 6:
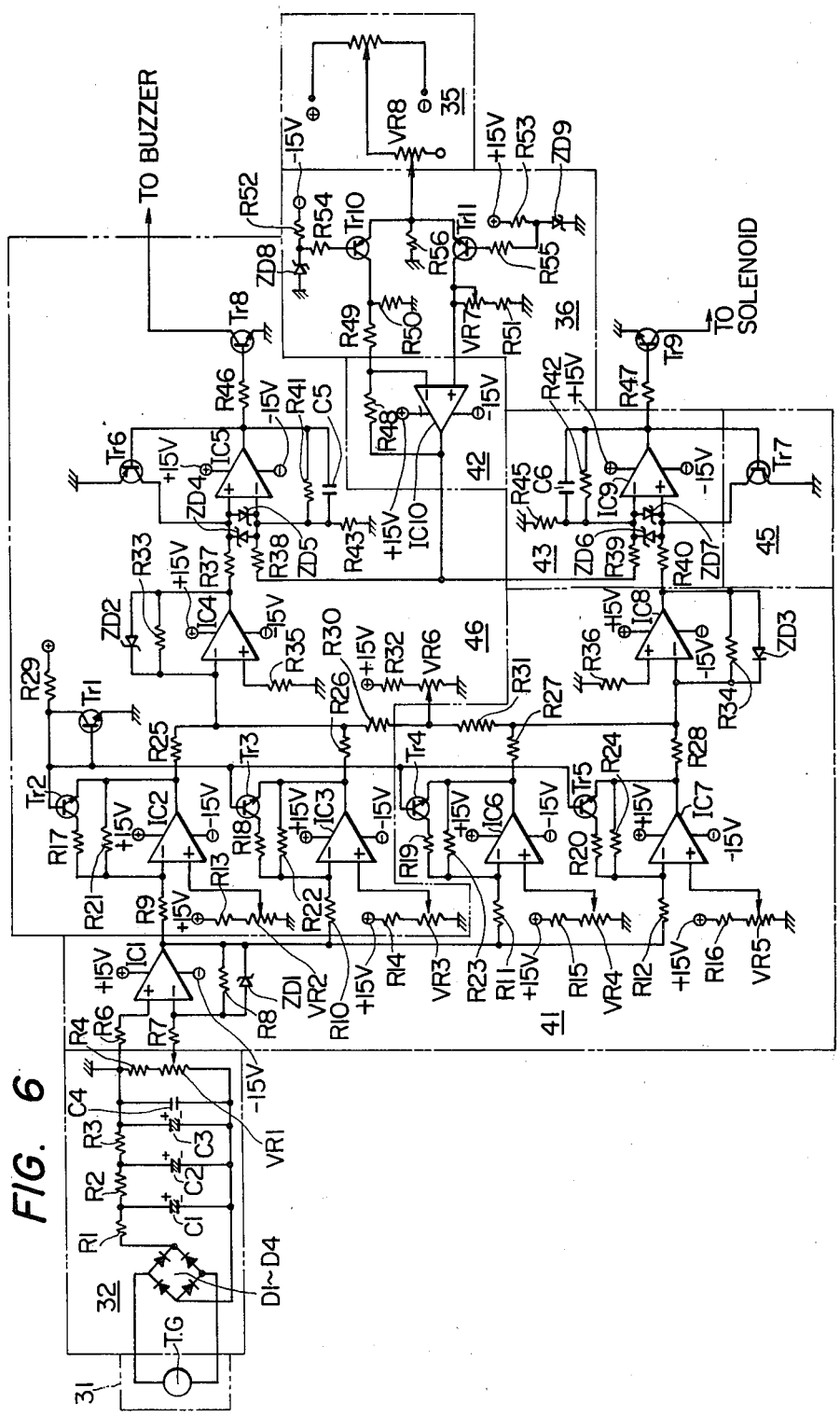
FIG. 6 is a detailed schematic diagram of the circuit of FIG. 2.

A specific example of a circuit constructed in accordance with the present invention is shown in the schematic diagram of FIG. 6. In this embodiment, the detecting circuit 46 is arranged in parallel, as described above, for actuation of the alarm.

Referring now to FIG. 6, a tachometer 31 is coupled through a rectifying and filtering circuit 32 which includes diode full-wave bridge D1-D4, resistors R1-R4, electrolytic capacitors C1-C3, capacitor C4, and potentiometer VR1 for adjusting the output level. The output signal from the wiper contact of the potentiometer VR1 is coupled to the inverting input of an operational amplifier IC1 through the resistor R7. The gain of the operational amplifier IC1 is determined by a resistor R8 and is clamped by a Zener diode ZD1.

The output of the operational amplifier IC1 is connected to an inverting input of operational amplifiers IC6 and IC7 through resistors R11 and R12, respectively. The operational amplifiers IC6 and IC7 provide different gains depending upon the magnitude of the input signal. The gain of the operational amplifier IC6 is determined by feedback resistor R23 and a transistor Tr4 coupled in series with a resistor R19 with the combination of the resistor R19 and transistor Tr4 coupled in parallel with the resistor R23 and between the output of the operational amplifier IC6 and its inverting input. Base bias to the transistor Tr4 is supplied by the circuit composed of the transistor Tr1 and resistor R29 in the detector circuit 46. If desired, a separate biasing circuit can be provided within the first amplifier 41 although it is more convenient and economical to use a single such circuit for both the first amplifier 41 and the detector 46. Similarly, the operational amplifier IC7 has a feedback circuit composed of resistors R20 and R24 and a transistor Tr5 with the values of the resistors R20 and R24 being selected different than those of the resistors R19 and R23 to provide the desired output characteristics. The non-inverting inputs of the amplifiers IC6 and IC7 are set to fixed voltages by potentiometer VR4 and VR5, respectively, which are fed current through resistors R15 and R16, respectively. The outputs of the operational amplifiers IC6 and IC7 are current summed through resistors R27 and R26 and coupled to the inverting input of an operational amplifier IC8. This input is biased through a potentiometer VR6 and resistor R32. The gain of the operational amplifier IC8 is determined by a feedback resistor R34 which is by-passed by a Zener diode ZD3. The output of the first amplifier 41 is formed on the output of the operational amplifier IC8.

The output of the potentiometer 35, which includes a level-setting potentiometer VR8, is fed to the input of the half-wave rectifier circuit 36. The half-wave rectifier circuit 36 includes a PNP transistor Tr10 and NPN transistor Tr11 the emitters of which are coupled to one another. The base of the transistor Tr10 is clamped to a fixed voltage through a resistor R34 to the cathode of a Zener diode ZD8 which is fed biasing current through a resistor R42. Similarly, the base of the transistor Tr11 is biased through resistors R36 and R43 and Zener diode ZD9. The collector of the transistor Tr10 is coupled to the inverting input of an operational amplifier IC10 of the second amplifier 42 while the collector of the transistor Tr11 is coupled to the non-inverting input thereof. The inverting input of the operational amplifier IC10 is biased by resistor R50 while the non-inverting input is biased through resistor R58 and a potentiometer VR7. The gain of the second amplifier 42 is set by a feedback resistor R48 coupled between its output and inverting inputs.

The outputs of the first amplifier 41 and second amplifier 42 are coupled, respectively, to the non-inverting and inverting inputs of an operational amplifier IC9 of the third amplifier 43. Zener diodes ZD6 and ZD7 are coupled back-to-back between the inverting and non-inverting inputs of the operational amplifier IC9. The operational amplifier IC9 has feedback components composed of a resistor R42 and capacitor C6 and is biased by resistor R45 coupled between the inverting input and ground. The function of the detector 45 is provided by a transistor Tr7 having a base coupled to the output of the operational amplifier IC9 and a collector coupled to the non-inverting input thereof with the emitter being grounded. The output of the operational amplifier IC9 and the base of the transistor Tr7 are coupled through a resistor R47 to the base of the transistor Tr9 the emitter of which is grounded. The collector of the transistor Tr9 is connected to a solenoid which operates the valve 24.

The detector 46 includes amplifiers IC2 and IC3 which operate in the same fashion as the amplifiers IC6 and IC7 of the first amplifier 41. The outputs of these two amplifiers are summed and coupled to the inverting input of an operational amplifier IC4. The gain of the operational amplifier IC4 is set by a feedback resistor R33 which is clamped by a Zener diode ZD2. The output of the amplifier IC4 is fed through a resistor R39 to the non-inverting input of an operational amplifier IC5 to the inverting input of which is coupled the output of the second amplifier 42. The operational amplifier IC5 is coupled and operated in the same fashion as the operational amplifier IC9 of the second amplifier 43 with the transistor Tr6 serving the same function as the transistor Tr7 of the detector circuit 45. The output of the operational amplifier IC5 is coupled through a resistor R45 to the base of a transistor Tr8 the collector of which is coupled to operate an alarm circuit such as a buzzer.

What is claimed is:

1. An apparatus for preventing a vehicle from turning over comprising: means for producing a signal representative of the speed of the vehicle; means for producing a second signal representing a steering angle of the vehicle; means for summing and amplifying said first and second signals to produce a third signal; means for producing a fourth signal when said third signal exceeds a predetermined constant value; and means for varying an operational parameter of said vehicle in response to said fourth signal.

2. The apparatus of claim 1 wherein said first signal is in proportion to the square root of said vehicle speed.

3. The apparatus of claim 1 wherein said second signal is in proportion to the sine of the steering angle.

4. The apparatus of claim 3 wherein said means for producing said second signal comprises a potentiometer having an output voltage having a magnitude which is in proportion to the rotational angle of an input shaft of said potentiometer.

5. The apparatus of claim 1 wherein said means for producing said fourth signal comprises means for comparing said third signal with a predetermined reference voltage and means for providing said fourth signal in proportion to the amount by which said third signal exceeds said predetermined reference voltage.

6. The apparatus of claim 1 further comprising an alarm and means for actuating said alarm in response to at least one of said third and fourth signals.

7. The apparatus of any of claims 1–6 wherein said means for varying said operational parameter comprises control valve means operatively disposed to control the flow of hydraulic fluid to a power steering unit of said vehicle.

* * * * *